(12) United States Patent
Houguchi

(10) Patent No.: US 12,305,633 B2
(45) Date of Patent: May 20, 2025

(54) PUMP

(71) Applicant: NITTO KOHKI CO., LTD., Tokyo (JP)

(72) Inventor: Kousei Houguchi, Tokyo (JP)

(73) Assignee: NITTO KOHKI CO., LTD., Tokyo (JP)

( * ) Notice: Subject to any disclaimer, the term of this patent is extended or adjusted under 35 U.S.C. 154(b) by 0 days.

(21) Appl. No.: 18/181,097

(22) Filed: Mar. 9, 2023

(65) Prior Publication Data

US 2023/0213028 A1 Jul. 6, 2023

Related U.S. Application Data

(63) Continuation of application No. PCT/JP2021/018447, filed on May 14, 2021.

(30) Foreign Application Priority Data

Sep. 25, 2020 (JP) .................... 2020-161170

(51) Int. Cl.

| F04B 49/02 | (2006.01) |
|---|---|
| F04B 17/03 | (2006.01) |
| H02K 5/04 | (2006.01) |
| H02K 7/14 | (2006.01) |
| H02K 11/25 | (2016.01) |

(52) U.S. Cl.
CPC .............. *F04B 49/02* (2013.01); *F04B 17/03* (2013.01); *H02K 5/04* (2013.01); *H02K 7/14* (2013.01); *H02K 11/25* (2016.01); *F04B 2203/0405* (2013.01)

(58) Field of Classification Search
CPC .......... F04B 17/03; F04B 49/02; F04B 49/10; F04B 2203/04; H02K 11/25; H02K 5/04; H02K 7/14
USPC .......................................... 417/32
See application file for complete search history.

(56) References Cited

U.S. PATENT DOCUMENTS

| 2010/0028184 A1* | 2/2010 | Hahn ................. F04C 23/008 417/32 |
|---|---|---|
| 2017/0218944 A1* | 8/2017 | Schmidt ................. F04B 51/00 |
| 2020/0318627 A1* | 10/2020 | Houguchi ............. F04B 39/123 |

FOREIGN PATENT DOCUMENTS

| JP | 86356145 | 3/1988 |
|---|---|---|
| JP | H04358779 | 12/1992 |
| JP | H0677469 | 10/1994 |
| JP | H0819222 | 1/1996 |

(Continued)

OTHER PUBLICATIONS

International Search Report issued in corresponding International Application PCT/JP2021/018447, mailed Jun. 22, 2021.

*Primary Examiner* — Philip E Stimpert
(74) *Attorney, Agent, or Firm* — Burris Law, PLLC

(57) ABSTRACT

The pump has an electromagnet for reciprocating a piston, and a first casing member at least partially accommodating the piston and the electromagnet. The electromagnet has a stator core and coils wound around the stator core. The pump further includes a thermal protector disposed on the stator core. The thermal protector is held between the casing member and the stator core. When the thermal protector detects that the stator core has heated up above a predetermined temperature, the supply of electric power to the electromagnet is interrupted to stop the drive of the piston.

5 Claims, 5 Drawing Sheets

(56) References Cited

FOREIGN PATENT DOCUMENTS

| | | | |
|---|---|---|---|
| JP | 2005312570 A | * 11/2005 | |
| JP | 5508999 | 6/2014 | |
| JP | 6730516 | 7/2020 | |
| WO | WO-2019124131 A1 | * 6/2019 | .......... F04B 11/0008 |

* cited by examiner

PUMP

CROSS-REFERENCE TO RELATED APPLICATIONS

This application is a continuation of International Application No. PCT/JP2021/018447, filed on May 14, 2021, which claims priority to and the benefit of Japanese Patent Application No. 2020-161170, filed on Sep. 25, 2020. The disclosures of the above applications are incorporated herein by reference in their entireties.

FIELD

The present disclosure relates to pumps and, more particularly, to a pump having a function of detecting abnormal overheating.

BACKGROUND

One type of well-known pump is configured to convey a fluid by reciprocating a reciprocating pumping member, such as a piston, by a magnetic field produced by an electromagnet (for example, Patent Literature 1). The electromagnet has a stator core and coils wound around the stator core. During the driving of the pump, the electromagnet heats up due to the flow of electric current through the coils. The electromagnet does not heat up to a very high temperature while the pump is normally operating, but the coils of the electromagnet may overheat abnormally when, for example, the piston fails to move because the reciprocation thereof is interfered with by some cause, or when the coils are short-circuited.

When the temperature of the electromagnet becomes excessively high, the electromagnet or other components may be broken. Further, the temperature of the entire pump may also become high, which is dangerous to the surroundings. Accordingly, there has been proposed a pump configured to stop the drive of the pump by detecting that the electromagnet has heated up above a predetermined temperature (Patent Literature 2). More specifically, the pump has an electromagnet equipped with an overheat detection element, e.g., a thermal protector or a temperature fuse, to stop the drive of the pump by interrupting the supply of electric power to the electromagnet when the overheat detection element detects that the electromagnet has heated up above a predetermined temperature. The heat generation source of the electromagnet is a coil through which large electric current flows. Therefore, the overheat detection element is directly attached to the coil.

CITATION LIST

Patent Literature

Patent Literature 1: Japanese Patent No. 6730516
Patent Literature 2: Japanese Patent Application Publication No. Hei 8-19222

The electromagnet of the pump disclosed in Patent Literature 1 has two coils disposed on one stator core (field core). With this electromagnet, when one of the coils is short-circuited, for example, the short-circuited coil heats up to a higher temperature than that of the other coil. Therefore, each of the two coils needs to be equipped with a overheat detection element in order to reliably detect overheating of each of the two coils. Patent Literature 1 also discloses a pump including two drive units, and the pump includes two electromagnets. Accordingly, it is necessary to attach at least one overheat detection element to each of the two electromagnets in order to reliably detect overheating of each electromagnet. That is, when a pump having a configuration as shown in Patent Literature 1 is provided with an overheat detection element as shown in Patent Literature 2, it may be impossible to detect abnormal heating of the coils unless each coil is provided with an overheat detection element. In other words, it is necessary to provide a number of overheat detection elements corresponding to the number of coils.

In addition, each coil is formed by winding a thin wire in many layers and therefore has an uneven outer surface. For this reason, the contact state between the overheat detection element and the coil is not stable, and this may prevent adequate detection of overheating of the coil. This problem may be solved by filling the gap between the overheat detection element and the coil with a resin having a high thermal conductivity, as shown in Patent Literature 2. However, the gap filling work is troublesome.

SUMMARY

An object of the present disclosure is to provide a pump capable of solving at least one of the above-described problems with the conventional technique.

The present disclosure provides a pump including: a reciprocating pumping member; an electromagnet having a stator core and a coil wound around the stator core, the electromagnet being configured to reciprocate the reciprocating pumping member by electromagnetic force; and an overheat detection element disposed on the stator core. The pump is configured such that when the overheat detection element detects that the stator core has heated up above a predetermined temperature, the drive of the reciprocating pumping member is stopped.

In the pump, the overheat detection element is disposed on the stator core to detect abnormal overheating of the coil on the basis of the temperature of the stator core heated by the coil. In a case where one stator core has a plurality of coils wound thereon, for example, regardless of which coil becomes abnormally overheated, the abnormal overheating can be detected with the one overheat detection element disposed on the stator core. Further, because the stator core can be formed into a plate-shaped member having an even surface, the overheat detection element can be easily disposed on the stator core in a stable contact state as compared to a case where the overheat detection element is disposed on the uneven outer surface of the coil.

The pump may further include a casing member at least partially accommodating the reciprocating pumping member and the electromagnet, and the overheat detection element may be held between the casing member and the stator core.

Further, the casing member may have an elastic retaining member retaining the overheat detection element such that the overheat detection element faces the stator core, and the overheat detection element may be pressed against the stator core by the elastic retaining member.

With the above-described arrangement, the overheat detection element can be easily disposed on the stator core in an even more stable state.

Further, the elastic retaining member may have a through-passage for communication between the outside and inside of the casing member to allow a power line for supplying electric power to the electromagnet to be disposed through the through-passage.

The pump may further include a plurality of pumping drive units each comprising the reciprocating pumping member and the electromagnet, and the stator cores of the plurality of pumping drive units may be integrally connected to each other to form a one-piece stator core member.

Further, the overheat detection element may be a single overheat detection element disposed on the one-piece stator core member, and the pump may have no overheat detection element other than the single overheat detection element on the one-piece stator core member. When the single overheat detection element detects that the one-piece stator core member, which constitutes the stator cores, has heated up above a predetermined temperature, the drive of all the reciprocating pumping members is stopped.

DRAWINGS

Embodiments of a pump according to the present disclosure will be explained below on the basis of the accompanying drawings.

DETAILED DESCRIPTION

Figure 1:
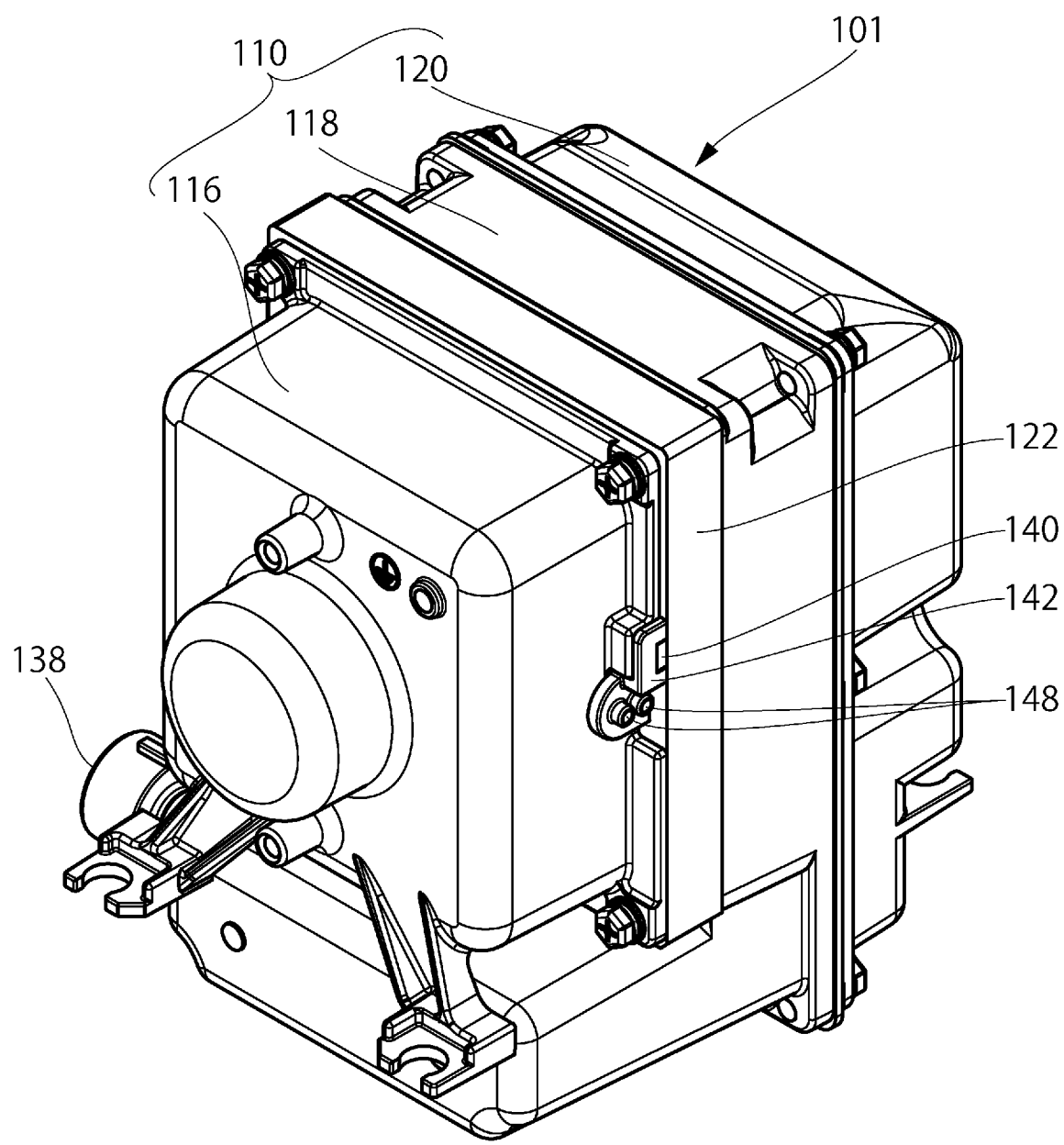
FIG. 1 is a perspective view of a pump according to a first embodiment of the present disclosure.
Figure 2:
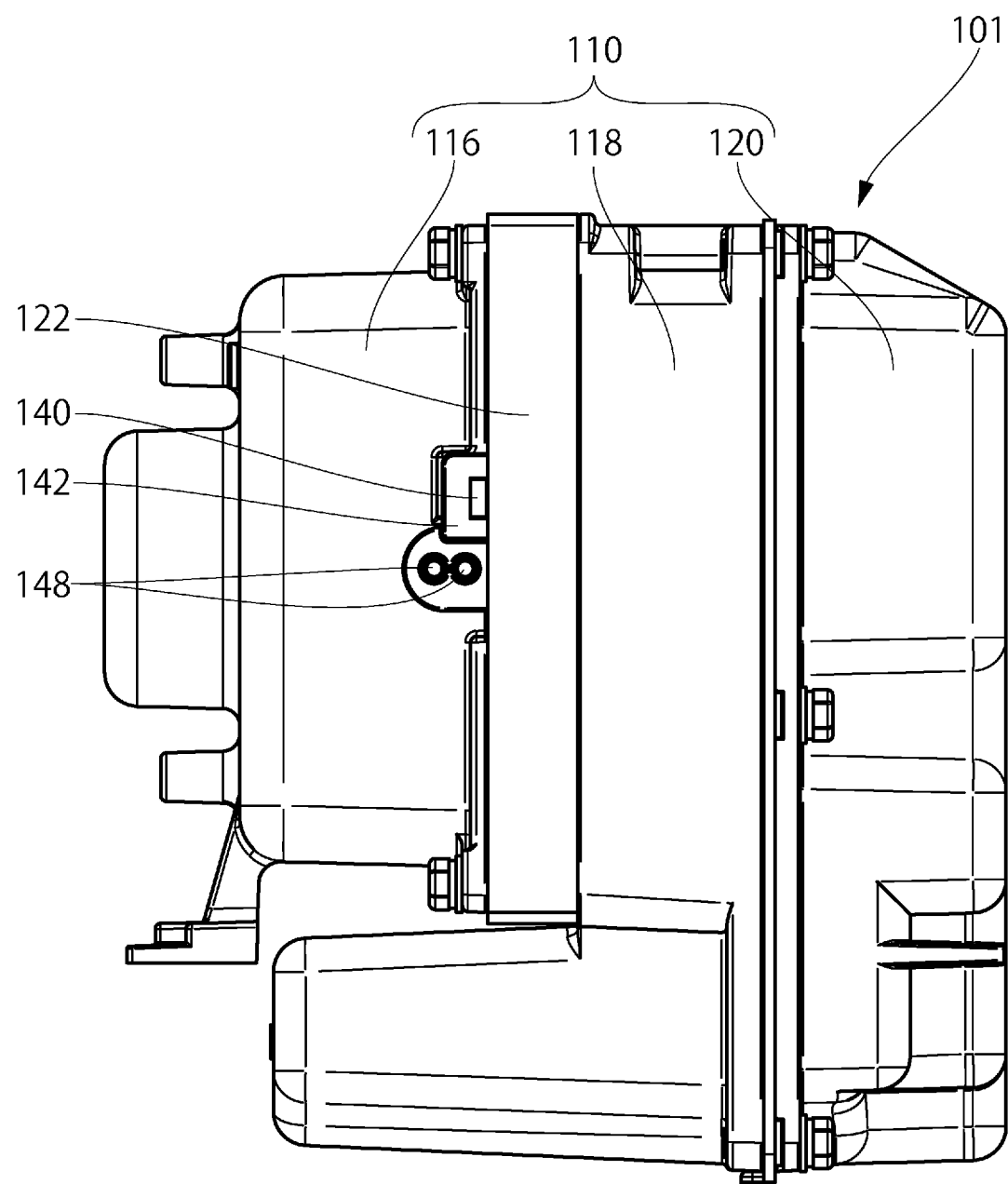
FIG. 2 is a side view of the pump shown in FIG. 1.
Figure 3:
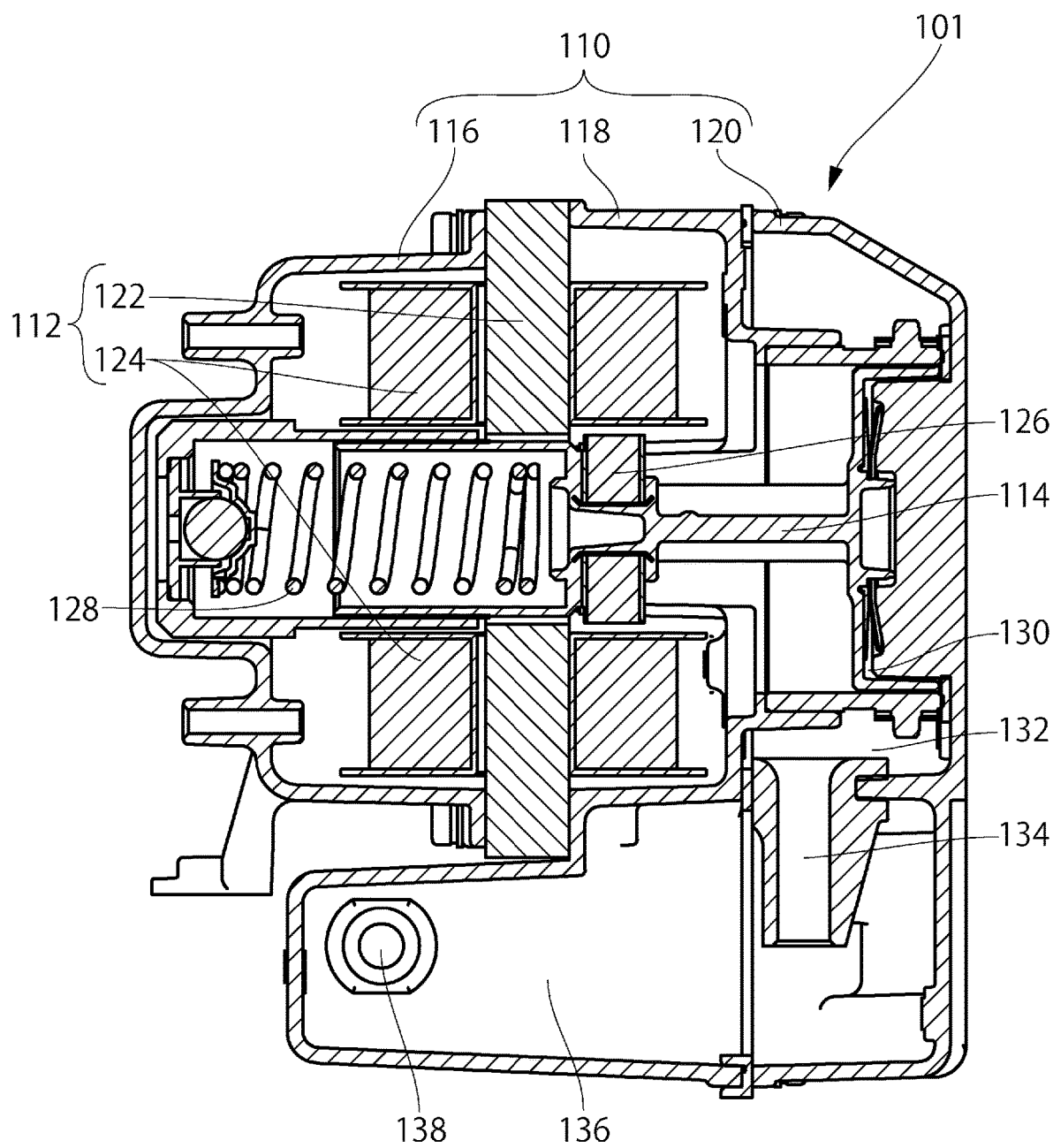
FIG. 3 is a side sectional view of the pump shown in FIG. 1.
Figure 4:
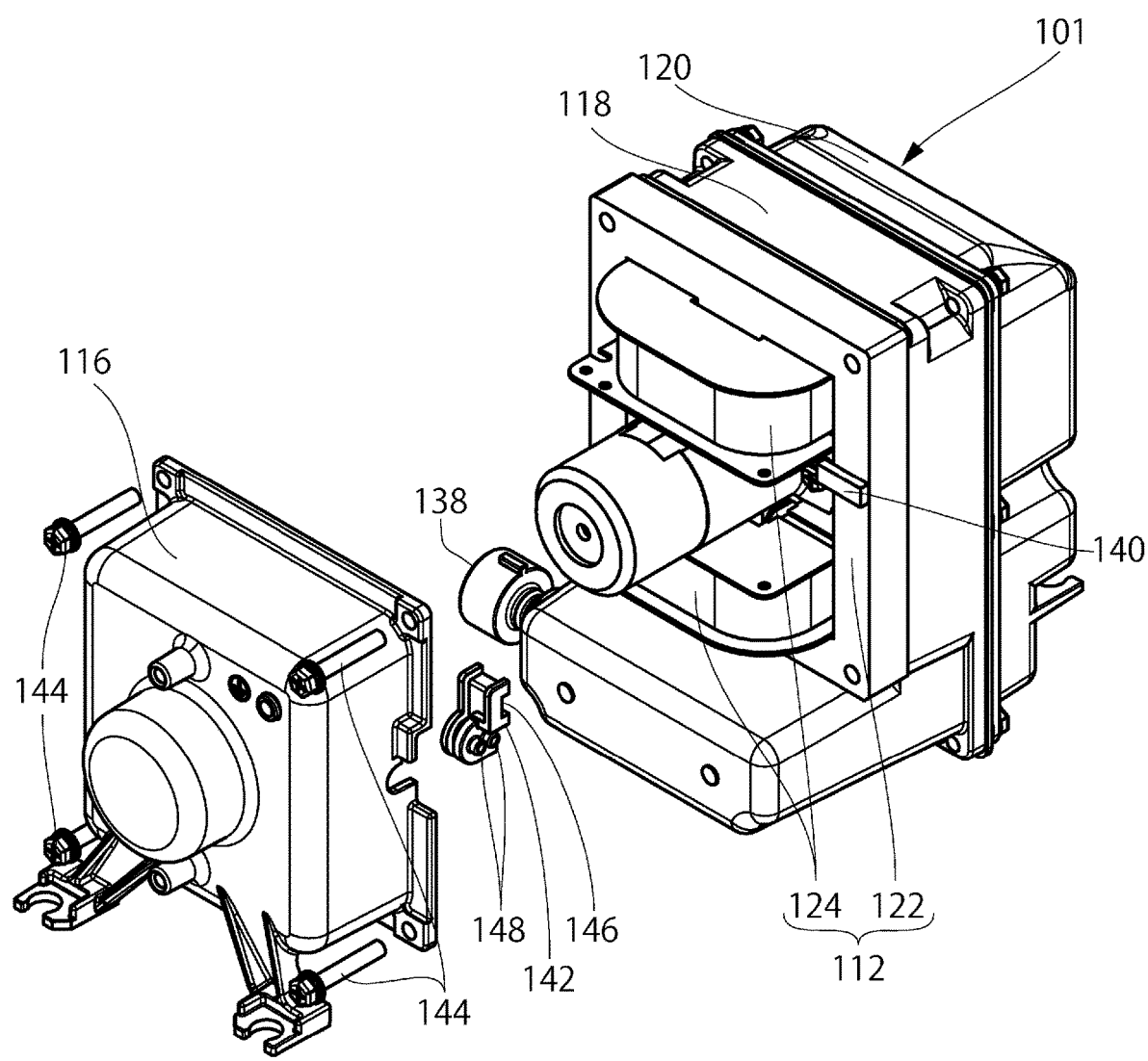
FIG. 4 is an exploded view of the pump shown in FIG. 1, shown with a first casing member detached therefrom.

As shown in FIGS. 1 to 4, a pump 101 according to a first embodiment of the present disclosure includes a casing 110, and an electromagnet 112 and a piston (reciprocating pumping member) 114, which are retained in the casing 110. The casing 110 comprises a forward first casing member 116, a central second casing member 118, and a rear third casing member 120. The electromagnet 112 has, as shown in FIG. 3, a stator core 122 formed by stacking a plurality of electromagnetic steel sheets, and two coils 124 wound around the stator core 122. The piston 114 is disposed between the two coils 124 so as to be reciprocatable in a horizontal direction.

A magnetic field is periodically produced from the stator core 122 in response to the application of an alternating current voltage to the coils 124. The produced magnetic field draws an armature 126 of the piston 114 into the stator core 122, thereby displacing the piston 114 leftward as seen in FIG. 3. As the intensity of the periodic magnetic field decreases and the attraction force decreases correspondingly, the piston 114 is then displaced rightward as seen in the figure by the urging force of a spring 128. As the intensity of the magnetic field increases and the attraction force increases again, the piston 114 is displaced leftward. In this way, the piston 114 periodically reciprocates left and right as seen in the figure in response to the periodic change in the magnetic field intensity of the electromagnet 112.

A pump chamber 130 is formed between the piston 114 and the third casing member 120. The volumetric capacity of the pump chamber 130 increases and decreases in response to the reciprocating motion of the piston 114. When the volumetric capacity of the pump chamber 130 decreases, air in the pump chamber 130 is compressed and delivered to a delivery chamber 132 disposed around the pump chamber 130 from an opening (not shown), which has been closed with a check valve, to reach a buffer chamber 136 through a passage 134. The air is temporarily stored in the buffer chamber 136 and finally delivered to the outside from a delivery port 138.

The pump 101 further has a thermal protector (overheat detection element) 140 disposed on the stator core 122, as shown in FIGS. 1 and 2, in such a manner as to be sandwiched between the first casing member 116 and the stator core 122. The first casing member 116 has an elastic retaining member 142 attached thereto at a position facing the stator core 122. The first casing member 116 partially accommodates the piston 114 and the electromagnet 112 and holds the stator core 122 between itself and the second casing member 118. In this state, the first casing member 116 is secured to the second casing member 118 with four bolts 144. At this time, the thermal protector 140 is held between the stator core 122 and the elastic retaining member 142 in a state of being retained in a groove 146 (FIG. 4) of the elastic retaining member 142, and pressed against the stator core 122 by the elastic force of the elastic retaining member 142. Thus, the thermal protector 140 and the stator core 122 are kept in close contact with each other. The elastic retaining member 142 further has two through-passages 148 formed therethrough to communicate between the outside and inside of the first casing member 116, and power lines (not shown) for supplying electric power to the electromagnet 112 are disposed through the through-passages 148. The elastic retaining member 142 not only has the function of retaining the thermal protector 140 but also has the function of retaining the power lines therethrough. It is therefore possible to reduce the number of component parts as compared to a case where these functions are implemented by using discrete members.

The thermal protector 140 has therein a contact formed from a bimetallic strip. The bimetallic strip is deformed to open the contact when its temperature exceeds a predetermined temperature. The pump 101 is configured such that when the thermal protector 140 opens, the supply of electric power to the electromagnet 112 is interrupted to stop the drive of the piston 114. The thermal protector 140 to be selected is one that opens at the temperature of the stator core 122 which is expected to be reached when the coils 124 of the electromagnet 112 become abnormally overheated. The electromagnetic steel sheets constituting the stator core 122 have a high thermal conductivity; therefore, when the coils 124 generate heat, the temperature of the stator core 122 also rises relatively rapidly. Accordingly, abnormal overheating of the coils 124 can be detected rapidly by monitoring the temperature of the stator core 122. Possible causes of the abnormal overheating of the coils 124 include that the reciprocating motion of the piston 114 is interfered with by some cause, and consequently large electric current flows through the coils 124, and that the coils 124 are short-circuited. When the piston 114 fails to move, the two coils 124 heat up to a high temperature in the same way, but when there is a short-circuit fault, one of the coils 124 that has been short-circuited heats up to a higher temperature. In the pump 101, the thermal protector 140 is disposed on the stator core 122 having two coils 124 wound thereon. It is therefore possible to detect abnormal overheating with the same one thermal protector 140 not only when the two coils 124 become overheated simultaneously, but also when only one of the coils 124 becomes overheated. Further, because the thermal protector 140 is disposed on the flat surface of the stator core 122, the thermal protector 140 and the stator core 122 are kept in a stable contact state, which makes it possible to reduce variation in the contact state among fabricated devices at the time of manufacture. The stabilized contact state between the thermal protector 140 and the stator core 122 enables stable heat transfer from the stator core 122 to the thermal protector 140 and makes it possible to detect abnormal overheating with the thermal protector 140 even more stably.

Figure 5:
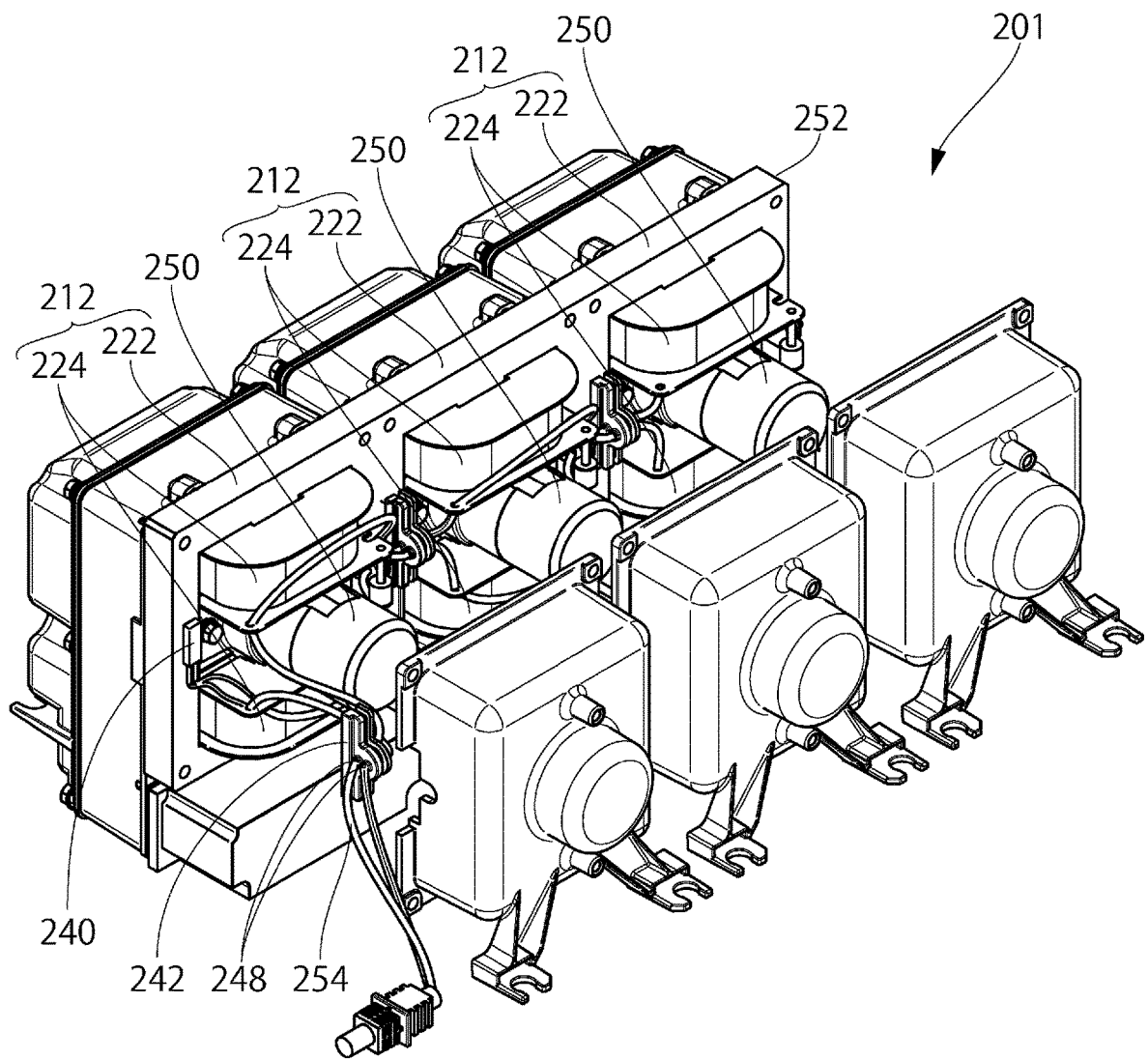
FIG. 5 is an exploded view of a pump according to a second embodiment of the present disclosure, shown with first casing members detached therefrom.

A pump 201 according to a second embodiment of the present disclosure has, as shown in FIG. 5, three pumping drive units 250 each comprising a piston (not seen in FIG. 5) and an electromagnet 212. The pumping drive units 250 are disposed side by side horizontally. The stator cores 222 of the three pumping drive units 250 of the electromagnets 212 are integrally connected to each other to form a one-piece stator core member 252. The pump 201 has an elastic retaining member 242 which is different in shape from the elastic retaining member 142 of the pump 101 according to the first embodiment but which has a similar function to the elastic retaining member 142. A thermal protector 240 is retained by the elastic retaining member 242, and in this state, the thermal protector 240 is disposed on the one-piece stator core member 252, which constitutes the stator cores 222, in close contact therewith. It should be noted that power lines 254 for supplying electric power to the electromagnets 212 are disposed through through-passages 248, respectively, in the elastic retaining member 242.

Each of the three stator cores 222 is formed as a part of the one-piece stator core member 252. Thus, the one-piece stator core member 252 is heated regardless of which coil 224 becomes overheated. Although the pump 201 has three pumping drive units 250, the one-piece stator core member 252 has a single thermal protector 240 provided thereon, and no other thermal protector is provided. When the single thermal protector 240 detects that the one-piece stator core member 252 has heated up above a predetermined temperature, the supply of electric power to all the coils 224 is interrupted to stop the reciprocating motion of all the pistons. Thus, with the pump 201, even when only one of a plurality of electromagnets 212 becomes overheated, the overheating can be detected with the single thermal protector 240. It should be noted that the thermal protector 240 may be disposed at a position near another pumping drive unit 250, and it is also possible to dispose two or more thermal protectors 240.

Although some embodiments of the present disclosure have been described above, the present disclosure is not limited to the described embodiments. For example, various temperature sensors such as a temperature fuse and a thermocouple may also be used as an overheat detection element in place of the above-described thermal protector. In addition, regarding the reciprocating pumping member, the piston may be replaced with a reciprocating pumping member having other configuration, e.g., a diaphragm.

What is claimed is:
1. A pump comprising:
a reciprocating pumping member;
an electromagnet having a stator core and a coil wound around the stator core, the electromagnet being configured to reciprocate the reciprocating pumping member by electromagnetic force;
an overheat detection element disposed on the stator core;
a casing member at least partially accommodating the reciprocating pumping member and the electromagnet; and
an elastic retaining member attached to the casing member at a position facing the stator core, the elastic retaining member having a groove for retaining the overheat detection element,
wherein the overheat detection element and the elastic retaining member are held between and sandwiched by the stator core and the casing member such that the overheat detection element is retained in the groove of the elastic retaining member and the elastic retaining member is compressed between the casing member and the overheat detection element, thereby pressing the overheat detection element against the stator core by elastic force of the elastic retaining member,
wherein when the overheat detection element detects that the stator core has heated up above a predetermined temperature, drive of the reciprocating pumping member is stopped.
2. The pump of claim 1, wherein the elastic retaining member has a through-passage for communication between outside and inside of the casing member to allow a power line for supplying electric power to the electromagnet to be disposed through the through-passage.
3. The pump of claim 1, including:
a plurality of pumping drive units each comprising the reciprocating pumping member and the electromagnet, wherein the stator cores of the plurality of pumping drive units are integrally connected to each other to form a one-piece stator core member.
4. The pump of claim 3, wherein the overheat detection element is a single overheat detection element disposed on the one-piece stator core member, the pump having no overheat detection element other than the single overheat detection element on the one-piece stator core member;
wherein when the single overheat detection element detects that the one-piece stator core member, which constitutes the stator cores, has heated up above a predetermined temperature, drive of all the reciprocating pumping members is stopped.
5. The pump of claim 1, wherein the casing member has an edge portion defining a recess for holding the elastic retaining member and the elastic retaining member has a groove portion for receiving the edge portion, such that the groove portion engages the edge portion when the elastic retaining member is attached to the casing member.

* * * * *